United States Patent
Ghaderi

(10) Patent No.: US 10,560,044 B2
(45) Date of Patent: Feb. 11, 2020

(54) MOTOR CONTROL METHOD, MOTOR CONTROL SYSTEM, AND ELECTRIC POWER STEERING SYSTEM

(71) Applicant: Nidec Corporation, Kyoto (JP)

(72) Inventor: Ahmad Ghaderi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 16/330,844

(22) PCT Filed: Aug. 1, 2017

(86) PCT No.: PCT/JP2017/027845
§ 371 (c)(1),
(2) Date: Mar. 6, 2019

(87) PCT Pub. No.: WO2018/047524
PCT Pub. Date: Mar. 15, 2018

(65) Prior Publication Data
US 2019/0214928 A1    Jul. 11, 2019

(30) Foreign Application Priority Data
Sep. 7, 2016  (JP) ................................. 2016-174319

(51) Int. Cl.
*H02P 21/09* (2016.01)
*H02P 23/24* (2016.01)
(Continued)

(52) U.S. Cl.
CPC ............ *H02P 21/09* (2016.02); *B62D 5/0463* (2013.01); *H02P 6/00* (2013.01); *H02P 21/16* (2016.02);
(Continued)

(58) Field of Classification Search
CPC .......... H02P 6/182; H02P 21/09; H02P 21/16; H02P 21/22; H02P 23/24; H02P 6/00; H02P 6/30; B62D 5/0463
See application file for complete search history.

(56) References Cited

U.S. PATENT DOCUMENTS

| 5,327,053 A * | 7/1994 | Mann ..................... H02P 6/182 318/400.04 |
| 6,555,981 B1 * | 4/2003 | Sun ........................ H02H 7/093 318/459 |

(Continued)

FOREIGN PATENT DOCUMENTS

| JP | 05-236783 A | 9/1993 |
| JP | 2001-128485 A | 5/2001 |

(Continued)

OTHER PUBLICATIONS

Official Communication issued in International Patent Application No. PCT/JP2017/027845, dated Oct. 31, 2017.

(Continued)

*Primary Examiner* — Thai T Dinh
(74) *Attorney, Agent, or Firm* — Keating & Bennett

(57) ABSTRACT

A motor control method includes acquiring a component $BEMF_\alpha$ on an α-axis and a component $BEMF_\beta$ on a β-axis of counter electromotive force of a motor in an αβ-fixed coordinate system; performing time differentiation on the component $BEMF_\alpha$ on the α-axis and the component $BEMF_\beta$ on the β-axis; obtaining a difference value between first and second multiplication values, the first multiplication value being obtained by multiplying the component $BEMF_\alpha$ on the α-axis by a differential value of the component $BEMF_\beta$ on the β-axis, the second multiplication value being obtained by multiplying the component $BEMF_\beta$ on the β-axis by a differential value of the component $BEMF_\alpha$ on the α-axis; detecting a rotation direction of the rotor based (Continued)

on the difference value; and controlling the motor based on a detection result of the rotation direction of the rotor.

7 Claims, 14 Drawing Sheets

(51) Int. Cl.
*H02P 6/00* (2016.01)
*H02P 21/16* (2016.01)
*H02P 21/22* (2016.01)
*B62D 5/04* (2006.01)

(52) U.S. Cl.
CPC .............. *H02P 21/22* (2016.02); *H02P 23/24* (2016.02); *B62D 5/0409* (2013.01)

(56) References Cited

U.S. PATENT DOCUMENTS

| | | | |
|---|---|---|---|
| 7,397,210 B2* | 7/2008 | Arai | H02P 21/06 318/434 |
| 7,500,538 B2* | 3/2009 | Hara | B62D 5/049 180/412 |
| 7,990,640 B2 | 8/2011 | Feng | |
| 2009/0079374 A1* | 3/2009 | De Four | H02P 6/182 318/400.34 |
| 2015/0211894 A1 | 7/2015 | Hibino | |

FOREIGN PATENT DOCUMENTS

| | | |
|---|---|---|
| JP | 2004-251755 A | 9/2004 |
| JP | 2005-114669 A | 4/2005 |
| JP | 2010-022196 A | 1/2010 |
| JP | 2012-157165 A | 8/2012 |

OTHER PUBLICATIONS

Ghaderi et al., "Wide-Speed-Range Sensorless Vector Control of Synchronous Reluctance Motors Based on Extended Programmable Cascaded Low-Pass Filters", IEEE Transactions on Industrial Electronics, vol. 58, No. 6, Jun. 2011, pp. 2322-2333.

* cited by examiner

MOTOR CONTROL METHOD, MOTOR CONTROL SYSTEM, AND ELECTRIC POWER STEERING SYSTEM

BACKGROUND OF THE INVENTION

1. Field of the Invention

The present disclosure relates to a motor control method, a motor control system, and an electric power steering system.

2. Description of the Related Art

In a control system of an electric motor (hereinafter, referred to as a "motor"), it is sometimes important to detect a rotation direction of a rotor. For example, in a washing-machine motor control system including a motor and a fan, in order to improve stability of the system, generally it is necessary to detect the rotation direction of the rotor during starting or low-speed drive. In an in-vehicle motor control system such as an Electric Power Steering (EPS) system, sometimes it is necessary to monitor the rotation direction of the rotor over a wide range from the low-speed drive to high-speed drive. For example, the rotational direction of the rotor can be detected based on an output signal from a position sensor. It is also known that the rotation direction of the rotor can be detected based on a relationship of a phase difference between currents (phase currents) passed through phases of the motor.

However, in the above conventional technique, it is difficult to more accurately detect the rotation direction of the rotor during the low-speed drive.

SUMMARY OF THE INVENTION

A motor control method according to an exemplary embodiment of the present disclosure includes acquiring a component $BEMF_\alpha$ on an $\alpha$-axis and a component $BEMF_\beta$ on a $\beta$-axis of counter electromotive force of a motor in an $\alpha\beta$-fixed coordinate system; performing time differentiation on the component $BEMF_\alpha$ on the $\alpha$-axis and the component $BEMF_\beta$ on the $\beta$-axis; obtaining a difference value between a first multiplication value and a second multiplication value, the first multiplication value being obtained by multiplying the component $BEMF_\alpha$ on the $\alpha$-axis by a differential value of the component $BEMF_\beta$ on the $\beta$-axis, the second multiplication value being obtained by multiplying the component $BEMF_\beta$ on the $\beta$-axis by a differential value of the component $BEMF_\alpha$ on the $\alpha$-axis; detecting a rotation direction of the rotor based on the difference value; and controlling the motor based on a detection result of the rotation direction of the rotor.

A motor control system according to an exemplary embodiment of the present disclosure includes a motor; and a control circuit that controls the motor. The control circuit acquires a component $BEMF_\alpha$ on an $\alpha$-axis and a component $BEMF_\beta$ on a $\beta$-axis of counter electromotive force in an $\alpha\beta$-fixed coordinate system; performs time differentiation on the component $BEMF_\alpha$ on the-$\alpha$ axis and the component $BEMF_\beta$ on the $\beta$-axis; obtains a difference value between a first multiplication value and a second multiplication value, the first multiplication value being obtained by multiplying the component $BEMF_\alpha$ on the $\alpha$-axis by a differential value of the component $BEMF_\beta$ on the $\beta$-axis, the second multiplication value being obtained by multiplying the component $BEMF_\beta$ on the $\beta$-axis by a differential value of the component $BEMF_\alpha$ on the $\alpha$-axis; detects a rotational direction of the motor based on the difference value; and controls the motor based on a detection result of the rotation direction of the motor.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

With reference to the accompanying drawings, hereinafter, a specific description will be given of a motor control method, a motor control system, and an electric power steering system including the motor control system, according to embodiments of the present disclosure. However, a specific description more than necessary will be occasionally omitted in order to avoid making the following description redundant more than necessary and to facilitate the understanding of a person skilled in the art. For example, a specific description on a well-known matter will be omitted occasionally. In addition, a repetitive description on substantially identical configurations will also be omitted occasionally.

Figure 1:
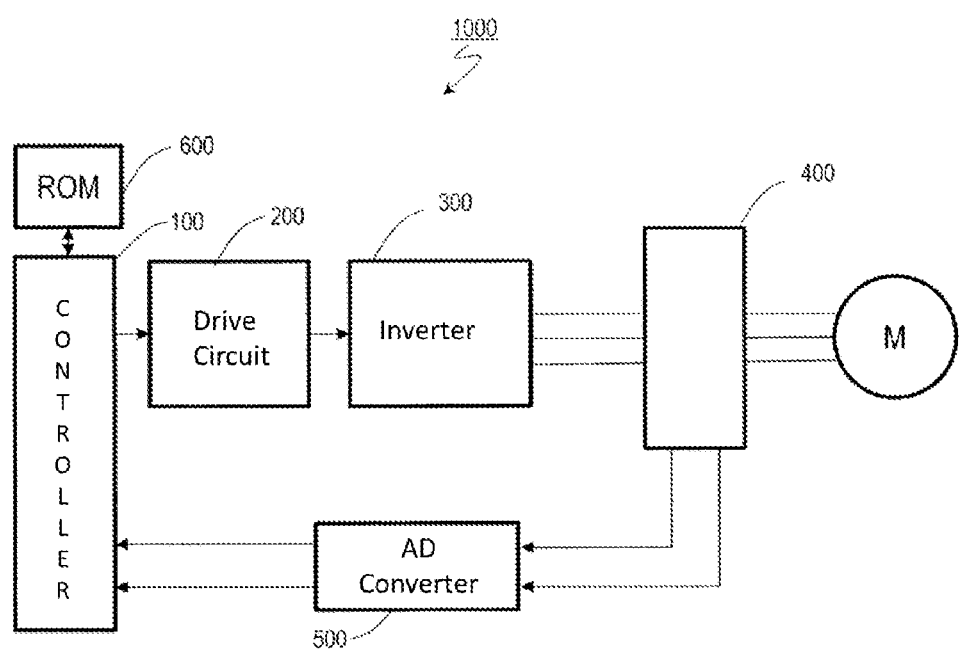
FIG. 1 is a block diagram of a hardware block of a motor control system 1000 according to a first exemplary embodiment of the present disclosure.

FIG. 1 schematically illustrates hardware blocks of a motor control system 1000 according to the present embodiment.

The motor control system 1000 typically includes a motor M, a controller (control circuit) 100, a drive circuit 200, an inverter (also referred to as an "inverter circuit") 300, a plurality of current sensors 400, an analog-to-digital conversion circuit (hereinafter, referred to as an "AD converter") 500, and a Read Only Memory (ROM) 600. For example, the motor control system 1000 may be designed in modules as a power pack, and may be manufactured and sold in the form of a motor module including a motor, a sensor, a driver, and a controller. It should be noted herein that the motor control system 1000 will be described as an exemplary system including as its constituent the motor M. Alternatively, the motor control system 1000 may be a system excluding as its constituent the motor M, the system being configured to drive the motor M.

Examples of the motor M may include a permanent magnet synchronous motor, such as a surface permanent magnet synchronous motor (SPMSM) or an interior permanent magnet synchronous motor (IPMSM), and a three-phase alternating-current motor. For example, the motor M includes three-phase (i.e., U phase, V phase, W phase) wires (not illustrated). The three-phase wires are electrically connected to the inverter 300. The motor M is not limited to the three-phase motor, but multi-phase motors such as five phases and seven phases are also within the scope of the present disclosure. In the description, a first embodiment of the present disclosure will be described with the motor control system that controls the three-phase motor as an example.

For example, the controller 100 is a micro control unit (MCU). Alternatively, the controller 100 may be a field programmable gate array (FPGA) in which a CPU core is incorporated, for example.

The controller 100 controls the entire motor control system 1000, and controls the torque and rotational speed of the motor M by, for example, vector control. The motor M may be controlled by any closed loop control in addition to the vector control. The rotational speed is expressed by a number of revolutions (rpm) at which a rotor rotates per unit time (for example, one minute) or the number of revolutions (rps) at which the rotor rotates per unit time (for example, one second). The vector control is a method of decomposing a current flowing through a motor into a current component contributing to generation of a torque and a current component contributing to generation of a magnetic flux, and independently controlling the current components that are perpendicular to each other. For example, the controller 100 sets a target current value according to an actual current value measured by a plurality of current sensors 400 and a rotor angle estimated based on the actual current value. The controller 100 generates a pulse width modulation (PWM) signal, based on the target current value, and then outputs the PWM signal to the drive circuit 200.

The controller 100 can detect a rotation direction of the rotor based on the actual current value measured by the plurality of current sensors 400. The controller 100 controls the motor M based on a detection result of the rotation direction of the rotor.

For example, the drive circuit 200 is a gate driver. The drive circuit 200 generates a control signal according to the PWM signal output from the controller 100 in order to control switching operation of a switching element in the inverter 300. It should be noted that the drive circuit 200 may be incorporated in the controller 100 as will be described later.

For example, the inverter 300 converts, into alternating-current power, direct-current power to be supplied from a direct-current power source (not illustrated), and then drives the motor M with the converted alternating-current power. For example, the inverter 300 converts direct-current power into three-phase alternating-current power of U-phase, V-phase, and W-phase pseudo sine waves, based on a control signal to be output from the drive circuit 200. The three-phase alternating-current power thus converted is used for driving the motor M.

The plurality of current sensors 400 include at least two current sensors that detect at least two of currents passed through U-phase, V-phase, and W-phase wires of the motor M. In the present embodiment, the plurality of current sensors 400 include two current sensors 400A, 400B (see FIG. 2) that detect the currents passed through the U-phase and V-phase wires. Alternatively, the plurality of current sensors 400 may include three current sensors that detect three currents passed through the U-phase, V-phase, and W-phase wires, or, for example, include two current sensors that detect the currents passed through the V-phase and W-phase wires or the currents passed through the W-phase and U-phase wires. For example, each current sensor includes a shunt resistor, and a current detection circuit (not illustrated) that detects a current flowing through the shunt resistor. For example, the shunt resistor has a resistance value of about 0.1Ω.

The AD converter 500 sampling analog signals output from the plurality of current sensors 400, converts the analog signals into a digital signals, and outputs the converted digital signals to the controller 100. Alternatively, the controller 100 may perform such AD conversion. In this case, the plurality of current sensors 400 directly output the analog signal to the controller 100.

Examples of the ROM 600 include a programmable memory (for example, a Programmable Read Only Memory (PROM)), a rewritable memory (for example, a flash memory), and a read-only memory. The ROM 600 stores a control program including a command group that causes the controller 100 to control the motor M. For example, in booting the motor control system 1000, the control program is once developed onto a random access memory (RAM) (not illustrated). The ROM 600 is not necessarily disposed outside the controller 100 as an external unit, but may be incorporated in the controller 100. For example, the controller 100 in which the ROM 600 is incorporated may be the above MCU.

Figure 2:
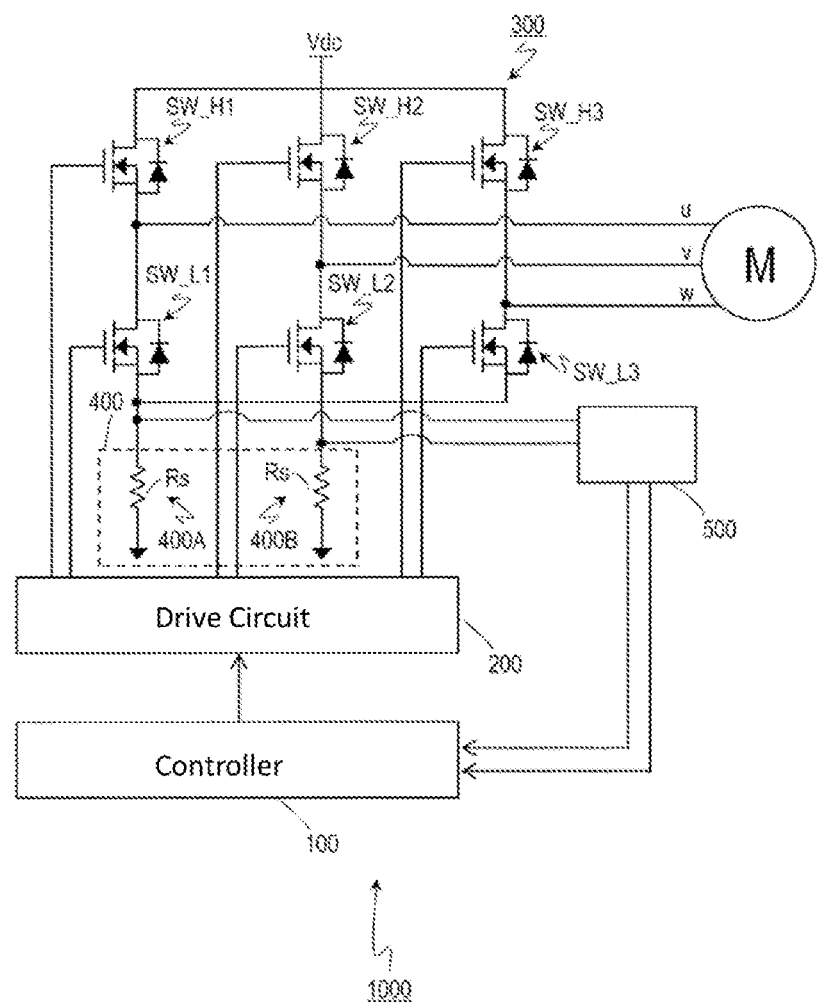
FIG. 2 is a block diagram of a hardware configuration of an inverter 300 in the motor control system 1000 according to the first exemplary embodiment of the present disclosure.

With reference to FIG. 2, a specific description will be given of a hardware configuration of the inverter 300.

FIG. 2 schematically illustrates the hardware configuration of the inverter 300 in the motor control system 1000 according to the present embodiment.

The inverter 300 includes three lower-arm switching elements and three upper-arm switching elements. In FIG. 2, switching elements SW_L1, SW_L2, and SW_L3 correspond to the lower-arm switching elements, and switching elements SW_H1, SW_H2, and SW_H3 correspond to the upper-arm switching elements. For example, a semiconductor switch element such as a Field Effect Transistor (FET, typically MOSFET) or an Insulated Gate Bipolar Transistor (IGBT) can be used as the switching element. Each switching element includes a freewheeling diode that allows a flow of regenerative current toward the motor M.

FIG. 2 illustrates shunt resistors Rs of the two current sensors 400A, 400B that detect the currents passed through the U-phase and V-phase wires, respectively. As illustrated in FIG. 2, for example, the shunt resistors Rs may be electrically connected between the lower-arm switching elements and the ground. Alternatively, for example, the shunt resistors Rs may be electrically connected between the upper-arm switching elements and the power source.

For example, the controller 100 performs three-phase energization control using the vector control, thereby driving the motor M. For example, the controller 100 generates a PWM signal for the three-phase energization control, and outputs the PWM signal to the drive circuit 200. The drive circuit 200 generates, based on the PWM signal, a gate control signal for controlling the switching operation of each FET in the inverter 300, and then sends the gate control signal to the gate of each FET.

Figure 3:
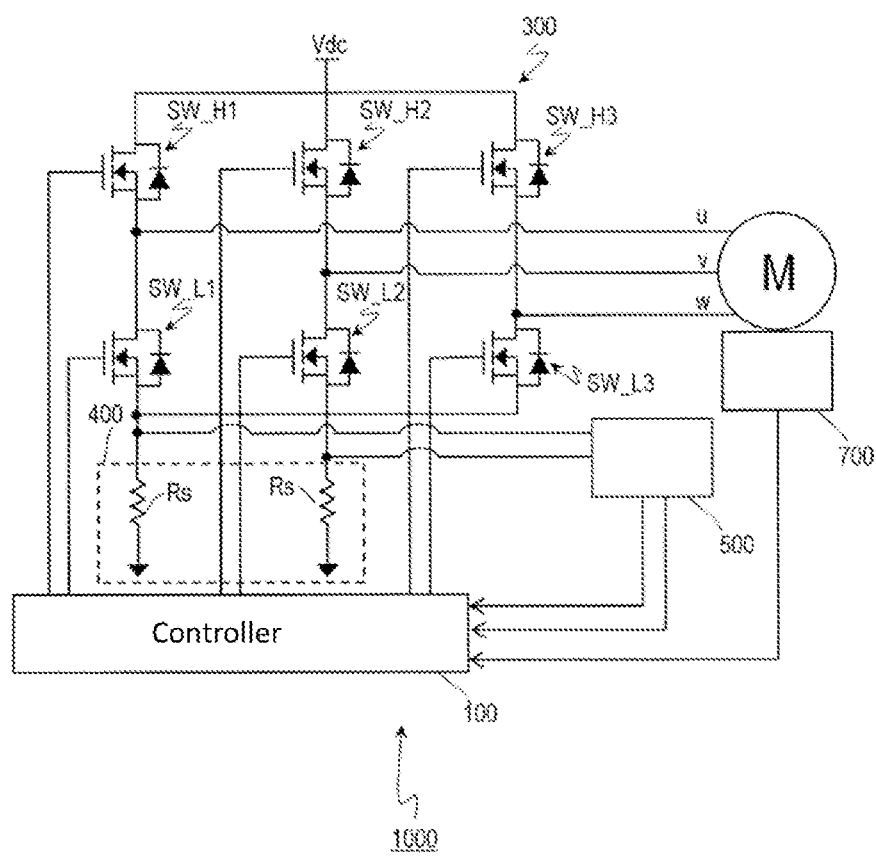
FIG. 3 is a block diagram of a hardware block of the motor control system 1000 according to a modification of the first exemplary embodiment of the present disclosure.

FIG. 3 schematically illustrates hardware blocks of the motor control system 1000 according to a modification of the present embodiment.

As illustrated in FIG. 3, the motor control system 1000 does not necessarily include the drive circuit 200. In this situation, the controller 100 includes ports for directly controlling the switching operations of the respective FETs in the inverter 300. Specifically, the controller 100 generates a gate control signal based on a PWM signal. The controller 100 outputs the gate control signal through the port, thereby providing the gate control signal to the gate of each FET.

As illustrated in FIG. 3, the motor control system 1000 may further include a position sensor 700. The position sensor 700 is disposed on the motor M to detect a position of the rotor. Specifically, the position sensor 700 detects the rotor angle of the motor M, namely, a mechanical angle of the rotor, and outputs the rotor angle to the controller 100. Examples of the position sensor 700 include a magnetic sensor such as an MR sensor including a magnetoresistive (MR) element and a Hall IC (including a Hall element), and a resolver.

The motor control system 1000 may include, for example, a speed sensor or an acceleration sensor, instead of the position sensor 700. In cases that the speed sensor is used as the position sensor, the controller 100 performs integration processing and the like on a rotational speed signal or an angular velocity signal to calculate a position of the rotor, namely, a rotation angle. An angular velocity (unit: rad/s) is expressed by an angle of rotation of the rotor per second. In cases that the acceleration sensor is used as the position sensor, the controller 100 performs the integration processing and the like on an angular acceleration signal to calculate the rotation angle.

The motor control system of the present disclosure can be applied to a motor control system, which does not include the position sensor and performs what is called sensorless control as illustrated in FIGS. 1 and 2, for example. The motor control system of the present disclosure can also be applied to a motor control system including the position sensor as illustrated in FIG. 3, for example.

Hereinafter, with reference to FIGS. 4 to 6, a specific example of a method for controlling the motor control system 1000 will be described with the motor control by the sensorless control as an example, and a technique of detecting the rotation direction of the rotor will mainly be described. The motor control method of the present disclosure can use various motor control systems required to detect the rotation direction of the rotor.

Figure 4:
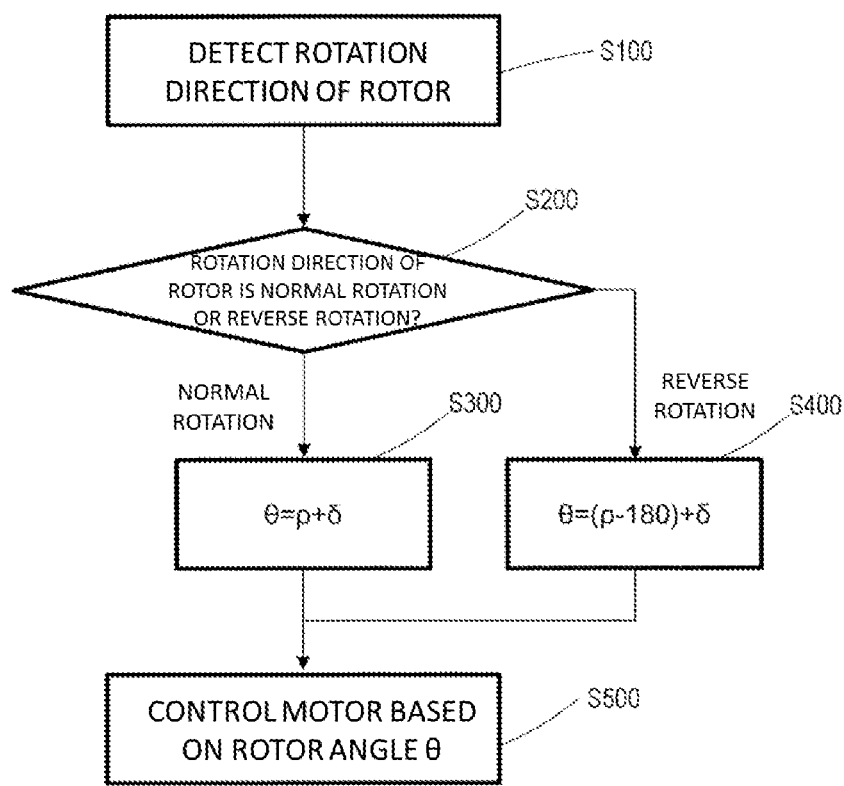
FIG. 4 is a flowchart illustrating an example of a processing procedure of a method for controlling the motor control system 1000.

FIG. 4 illustrates an example of a processing procedure of the method for controlling the motor control system 1000. As illustrated in FIG. 4, the motor control system 1000 detects the rotation direction of the rotor, calculates the rotor angle based on the detection result, and controls the motor M based on the calculated rotor angle θ. Each procedure will be described later in detail.

An algorithm of the motor control method of the present embodiment may be implemented with only hardware such as an Application Specific Integrated Circuit (ASIC) or a FPGA, or implemented by a combination of hardware and software.

Figure 5:
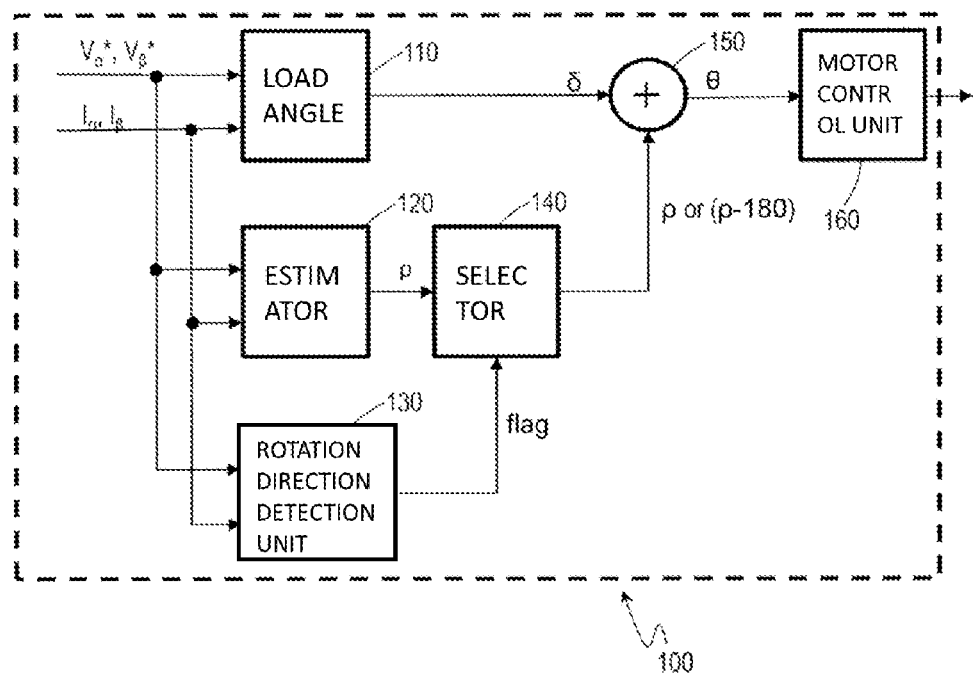
FIG. 5 is a functional block diagram illustrating a functional block of a controller 100.

FIG. 5 schematically illustrates a functional block of the controller 100. As used herein, each block is not illustrated on a hardware basis, but is illustrated on a functional block basis in the functional block diagram. For example, the software may be a module constituting a computer program for executing specific processing corresponding to each functional block.

As illustrated in FIG. 5, for example, the controller 100 includes a load angle unit 110, an estimator 120, a rotation direction detection unit 130, a selector 140, an adder 150, and a motor control unit 160. The controller 100 can detect the rotational direction of the rotor based on the reference voltages $V_a^*$, $V_b^*$, the armature currents $I_\alpha$, $I_\beta$. As used herein, each functional block is referred to as a "unit" for convenience of the description. Naturally, the term "unit" is not used to limit and interpret each functional block to and as hardware or software.

In cases where the respective functional blocks are mounted as software in the controller 100, the software may be executed by, for example, a core of the controller 100. As described above, the controller 100 may be implemented with a FPGA. In this situation, all of or some of the functional blocks may be implemented by hardware. In addition, when the processing is executed in a decentralization manner using a plurality of FPGAs, load of calculation on a specific computer is decentralized. In this case, all or some of the functional blocks in FIG. 5 can separately be mounted in the plurality of FPGAs. The FPGAs are interconnected by, for example, an on-board control area network (CAN) to exchange data with one another.

For example, in three-phase energization control, a sum of the currents passed through the three phases is zero. In other words, a relation to be satisfied is that a sum of the currents $I_a$, $I_b$, and $I_c$ is zero. As used herein, a current $I_a$ flows through the U-phase wire of the motor M, a current $I_b$ flows through the V-phase wire of the motor M, and a current $I_c$ flows through the W-phase wire of the motor M.

The controller 100 (for example, a core) receives two of the currents $I_a$, $I_b$, and $I_c$, and calculates the remaining one of the currents $I_a$, $I_b$, and $I_c$. In the first embodiment, the controller 100 acquires the current $I_a$ measured by the current sensor 400A and the current $I_b$ measured by the current sensor 400B. The controller 100 calculates the current $I_c$ based on the currents $I_a$, $I_b$ using the relation that the sum of the currents $I_a$, $I_b$, and $I_c$ is zero. The currents $I_a$, $I_b$, and $I_c$ measured using the three current sensors may be input to the controller 100.

The controller 100 (for example, the core) can convert the currents $I_a$, $I_b$, and $I_b$ into a current $I_\alpha$ on an α-axis and a current $I_\beta$ on a β-axis in an αβ-fixed coordinate system using what is called a Clarke transformation used for vector control or the like. The αβ-fixed coordinate system is a stationary coordinate system. The α-axis extends in a direction of one of three phases (e.g., a U-phase direction), and the β-axis extends in a direction perpendicular to the α axis.

The controller 100 (for example, the core) converts reference voltages $V_a^*$, $V_b^*$ and $V_c^*$ into the reference voltage $V_\alpha^*$ on the α-axis and the reference voltage $V_\beta^*$ on the β-axis in the αβ-fixed coordinate system using the Clarke transformation. The reference voltages $V_a^*$, $V_b^*$, and $V_c^*$ respectively represent the PWM signals for controlling the switching elements in the inverter 300.

For example, the calculation for obtaining the currents $I_\alpha$, $I_\beta$ and the reference voltages $V_\alpha^*$, $V_\beta^*$ can also be performed by the motor control unit 160 of the controller 100. The currents $I_\alpha$, $I_\beta$ and the reference voltages $V_\alpha^*$, $V_\beta^*$ are input to the load angle unit 110, the estimator 120, and the rotation direction detection unit 130.

The load angle unit 110 calculates a load angle δ based on the currents $I_\alpha$, $I_\beta$ and the reference voltages $V_\alpha^*$, $V_\beta^*$. For example, the load angle unit 110 calculates a component $\Psi_\alpha$ on the α-axis of a complex magnetic flux $\Psi$ based on Equation (1) below, and calculates a component $\Psi_\beta$ on the β-axis of the complex magnetic flux $\Psi$ based on Equation (2) below. In Equations (1) and (2), LPF expresses the performance of the processing using a low-pass filter. The complex magnetic flux $\Psi$ is given by Equation (3) below.

$$\Psi_\alpha = \text{LPF}(V_\alpha^* - R \cdot I_\alpha) \quad \text{Equation (1)}$$

$$\Psi_\beta = \text{LPF}(V_\beta^* - R \cdot I_\beta) \quad \text{Equation (2)}$$

$$\Psi = (\Psi_\alpha^2 + \Psi_\beta^2)^{1/2} \quad \text{Equation (3)}$$

In Equation (2), R represents an armature resistance. For example, the armature resistance R is set to the load angle unit 110 by the core of the controller 100.

The load angle unit 110 converts the currents $I_\alpha$, $I_\beta$ into a current $I_d$ on a d-axis and a current $I_q$ on a q-axis in a dq-rotating coordinate system using what is called a Park transformation used for the vector control and the like. The dq-rotating coordinate system refers to a rotating coordinate system that rotates together with a rotor. The load angle unit 110 calculates the load angle δ based on Equation (4) below. For example, the load angle δ is expressed by an angle between a complex magnetic flux vector (magnitude $\Psi$) and the d-axis in the dq-rotating coordinate system, and is an angle with a counterclockwise direction as a positive direction.

$$\delta = \tan^{-1}\{(L_q \cdot I_q)/\Psi\} \quad \text{Equation (4)}$$

where $L_q$ expresses armature inductance on the q-axis in the dq-rotating coordinate system.

The load angle unit 110 outputs the load angle δ to the adder 150.

The estimator 120 estimates a phase angle ρ based on the currents $I_\alpha$, $I_\beta$ and the reference voltages $V_\alpha^*$, $V_\beta^*$. Similarly to the load angle unit 110, for example, the estimator 120 calculates the magnetic flux components $\Psi_\alpha$, $\Psi_\beta$ based on Equations (1) and (2) above. For example, the estimator 120 further calculates the phase angle ρ based on Equation (5) below. The phase angle ρ is expressed by the angle between the complex magnetic flux vector and the α-axis in the αβ-fixed coordinate system, and is an angle with the counterclockwise direction as the positive direction. The estimator 120 outputs the phase angle ρ to the selector 140.

$$\rho = \tan^{-1}(\Psi\beta/\Psi\alpha) \quad \text{Equation (5)}$$

The rotation direction detection unit 130 detects the rotation direction of the rotor based on the currents $I_\alpha$, $I_\beta$ and the reference voltages $V_\alpha^*$, $V_\beta^*$. The rotation direction of the rotor is generally a normal rotation direction and a reverse rotation direction. In the description, the direction in which the rotor rotates counterclockwise about an axis of a shaft as viewed from a load side is referred to as "normal rotation direction", the direction in which the rotor rotates clockwise around the axis of the shaft is referred to as "reverse rotation direction". The normal rotation and reverse rotation directions can differently be defined in each product specification.

Figure 6:
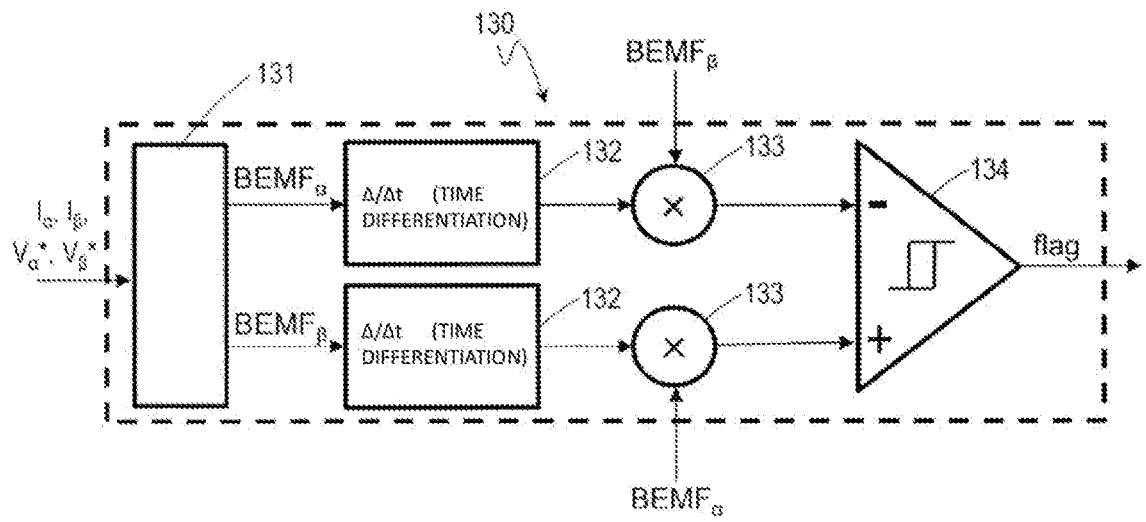
FIG. 6 is a functional block diagram illustrating a functional block in a rotation direction detection unit 130.

FIG. 6 illustrates the functional block of the rotation direction detection unit 130 in detail. For example, the rotation direction detection unit 130 includes a counter electromotive force calculation unit 131, a time differentiation unit 132, a multiplier 133, and a comparator 134.

The counter electromotive force calculation unit 131 calculates a counter electromotive force component $\text{BEMF}_\alpha$ on the α-axis and the counter electromotive force component $\text{BEMF}_\beta$ on the β-axis based on the currents $I_\alpha$, $I_\beta$ and the reference voltages $V_\alpha^*$, $V_\beta^*$ using Equations (6) and (7) below. Consequently, the counter electromotive force components $\text{BEMF}_\alpha$ and $\text{BEMF}_\beta$ are acquired.

$$\text{BEMF}_\alpha = V_\alpha^* - R \cdot I_\alpha \quad \text{Equation (6)}$$

$$\text{BEMF}_\beta = V_\beta^* - R \cdot I_\beta \quad \text{Equation (7)}$$

The time differentiation unit 132 performs time differentiation on the counter electromotive force component $\text{BEMF}_\alpha$, and performs the time differentiation on the counter electromotive force component $\text{BEMF}_\beta$. The time differentiation values of the counter electromotive force components $\text{BEMF}_\alpha$ and $\text{BEMF}_\beta$ are output to the multiplier 133.

The multiplier 133 multiplies the time differentiation value of the counter electromotive force component $\text{BEMF}_\alpha$ by the time differentiation value of the counter electromotive force component $\text{BEMF}_\beta$ to generate a first multiplication value. The multiplier 133 also multiplies the time differentiation value of the counter electromotive force component $BEMF_\beta$ by the time differentiation value of the counter electromotive force component $BEMF_\alpha$ to generate a second multiplication value. The first and second multiplication values are output to the comparator 134.

For example, the comparator 134 is a hysteresis comparator. According to the hysteresis comparator, a jitter of the output signal can be prevented even if a noise is added to the input signal. The comparator 134 obtains a difference value diffA between the first and second multiplication values based on Equation (8) below, and outputs a flag signal flag according to the difference value diffA. The flag signal flag is a digital signal, and indicates the rotation direction of the rotor.

$$\text{diff}A = BEMF_\alpha \cdot BEMF_\beta' - BEMF_\alpha' \cdot BEMF_\beta \qquad \text{Equation (8)}$$

where "'" expresses an operator of the time differentiation.

The first multiplication value is input to an input terminal on a positive (+) side of the comparator 134, and the second multiplication value is input to an input terminal on a negative (−) side of the comparator 134. The comparator 134 obtains the difference value diffA by subtracting the second multiplication value from the first multiplication value. For example, in the case that an EPS system is considered, a threshold of an upper limit of a hysteresis of the comparator 134 can be set to about 200 mV, and a threshold of a lower limit can be set to about −200 mV.

For example, the comparator 134 can output the flag signal flag indicating a high level "1" or a low level "0" according to the difference value diffA. The low-level flag signal flag indicates that the rotor is rotating in the normal rotation direction, and the high-level flag signal flag indicates that the rotor is rotating in the reverse rotation direction.

The counter electromotive force components $BEMF_\alpha$ and $BEMF_\beta$ calculated based on Equations (6) and (7) above can be expressed using a fundamental wave and a harmonic wave. At this point, in order to remove the harmonic wave (high frequency), for example, the counter electromotive force components $BEMF_\alpha$ and $BEMF_\beta$ are generally filtered using a general-purpose low-pass filter included in the controller 100. Through this processing, the counter electromotive force components $BEMF_\alpha$ and $BEMF_\beta$ can be expressed only by the fundamental wave in Equations (9) and (10) below.

$$BEMF_\alpha = BEMF \cdot \cos(\rho) \qquad \text{Equation (9)}$$

$$BEMF_\beta = BEMF \cdot \sin(\rho) \qquad \text{Equation (10)}$$

$$BEMF = (BEMF_\alpha^2 + BEMF_\beta^2)^{1/2} \qquad \text{Equation (11)}$$

where BEMF is magnitude of the counter electromotive force vector, and is obtained based on Equation (11) above. ρ is a phase angle, and for example, is expressed as a function of the time t in Equation (12). ω expresses the rotational speed (sometimes referred to as "electric speed") obtained by performing the time differentiation on an electric angle (rotor angle), and ρ(0) expresses an initial phase.

$$\rho(t) = \omega \cdot t + \rho(0) \qquad \text{Equation (12)}$$

When the difference value diffA is obtained based on the counter electromotive force components $BEMF_\alpha$ and $BEMF_\beta$ expressed by the fundamental wave, the difference value diffA can approximately be given by Equation (13) below.

$$\text{diff}A \approx \omega \cdot BEMF^2 \cdot \cos^2(\rho) + \omega \cdot BEMF^2 \cdot \sin^2(\rho) \approx \omega BEMF^2 \qquad \text{Equation (13)}$$

The comparator 134 detects the rotation direction of the rotor based on the difference value diffA. Specifically, the comparator 134 can detect the rotation of the rotor in one of the normal rotation and reverse rotation directions when the difference value diffA is a positive value, and the comparator 134 can detect the rotation of the rotor in the other of the normal rotation and reverse rotation directions when the difference value diffA is a negative value. In the present embodiment, the comparator 134 detects the rotation of the rotor in the normal rotation direction when the difference value diffA is the positive value, and the comparator 134 detects the rotation of the rotor in the reverse rotation direction when the difference value diffA is the negative value. When the difference value diffA indicates "0", the comparator 134 detects a stop of the rotor.

A polarity of differential input of the comparator 134 in FIG. 6 may be reversed. That is, the comparator 134 may obtain a difference value diffB by subtracting the first multiplication value from the second multiplication value, and generate the flag signal flag based on the difference value diffB. In this case, the comparator 134 detects the rotation of the rotor in the normal rotation direction when the difference value diffB is the negative value, and detects the rotation of the rotor in the reverse rotation direction when the difference value diffB is the positive value. In this way, the rotation direction of the rotor can be detected even if the polarity of the differential input is reversed.

In the algorithm of the present embodiment for detecting the rotation direction of the rotor, the rotation direction of the rotor can correctly be detected by a simpler calculation without measuring or calculating the rotor angle using the position sensor. As a result, a load on the calculation of the computer of the motor control system can be reduced. The rotation direction of the rotor can correctly be detected during the low-speed operation of the motor. As described above, necessity of the measurement of the rotor angle using the position sensor is eliminated, so that the technique of detecting the rotation direction of the rotor of the present embodiment can suitably be applied to the sensorless control.

The controller 100 determines whether the rotation direction of the rotor is the normal rotation direction or the reverse rotation direction.

The controller 100 calculates the rotor angle θ based on the phase angle ρ, the load angle δ, and the detection result of the rotation direction of the rotor. Specifically, the selector 140 in FIG. 5 outputs ρ or (ρ−180°) to the adder 150 according to the flag signal flag. For example, the selector 140 outputs p to the adder 150 when the flag signal flag indicates "0", and the selector 140 outputs (ρ−180°) to the adder 150 when the flag signal flag indicates "1".

When the flag signal flag indicates the rotation of the rotor in the normal rotation direction, namely, when the rotation of the rotor in the normal rotation direction is detected, the controller 100 calculates the rotor angle θ based on Equation (14) below.

$$\theta = \rho + \delta \qquad \text{Equation (14)}$$

When the flag signal flag indicates the rotation of the rotor in the reverse rotation direction, namely, when the rotation of the rotor in the reverse rotation direction is detected, the controller 100 calculates the rotor angle θ based on Equation (15) below.

$$\theta = (\rho - 180°) + \delta \qquad \text{Equation (15)}$$

The motor control unit 160 controls the motor based on the detection result of the rotation direction of the rotor.

Specifically, the motor control unit 160 can control the motor by the sensorless control using the rotor angle θ calculated by the adder 150. The motor control unit 160 performs the calculation required for typical vector control, for example. It should be noted that the vector control is a known technique; therefore, the specific description thereof will not be given here.

In the present embodiment, the sensorless control can be performed with no use of the position sensor, so that a malfunction of the position sensor, an increase in system cost due to addition of hardware, and the like can be prevented. The calculation for detecting the rotation direction of the rotor is simplified, so that memory cost can also be reduced.

A verification result of validity of the algorithm used to detect the rotation direction of the rotor of the present disclosure will be illustrated using the "Rapid Control Prototyping (RCP) System" (from dSPACE) and Matlab/Simulink (from MathWorks). A model of surface magnet type (SPM) motor controlled by the vector control was used for this verification. Table 1 illustrates values of various system parameters in the verification.

TABLE 1

| | |
|---|---|
| Inertia moment | $6.9e^{-5}$ [kg · m$^2$] |
| Frictional coefficient | $5.1e^{-3}$ [Nm/(rad/s)] |
| Resistance (motor + ECU) | 8.50 mΩ + 5.43 mΩ |
| $L_d$ (nominal) | 40.7 μH |
| $L_q$ (nominal) | 38.8 μH |
| Voltage range | 10~16 V |
| Temperature range | −40° C.~90° C. |
| Motor type | DC Brushless motor |
| The number of poles | 8 |
| The number of slots | 12 |
| Maximum current | 77 A |
| Rated voltage | 13.5 V |
| Rated temperature | 80° C. |
| Maximum torque | 5.96 N · m |
| Diameter of wire | φ1.45 mm |
| The number of turns | 11.5 |

Figure 7:
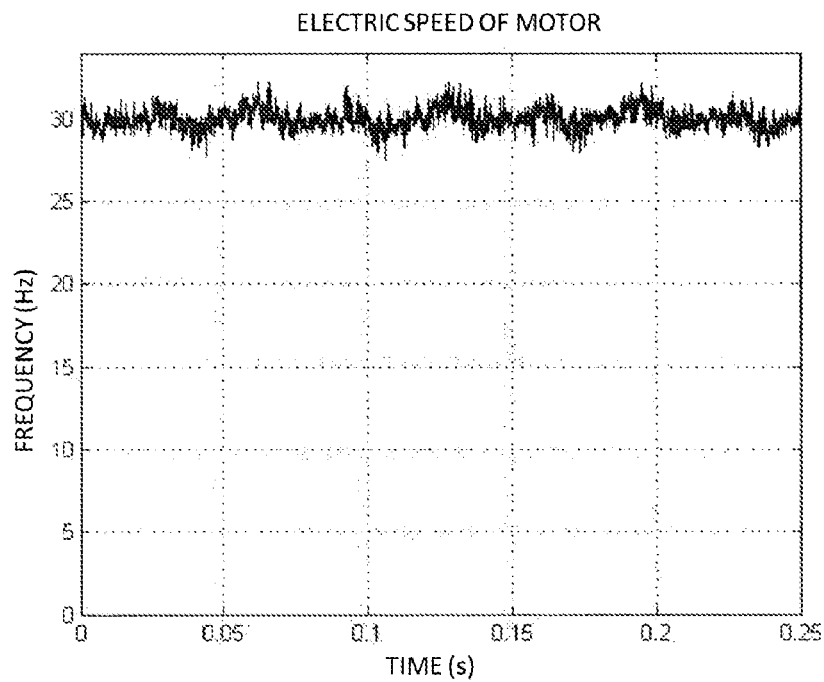
FIG. 7 is a graph illustrating a waveform of an electric speed of a motor within a predetermined period.
Figure 8:
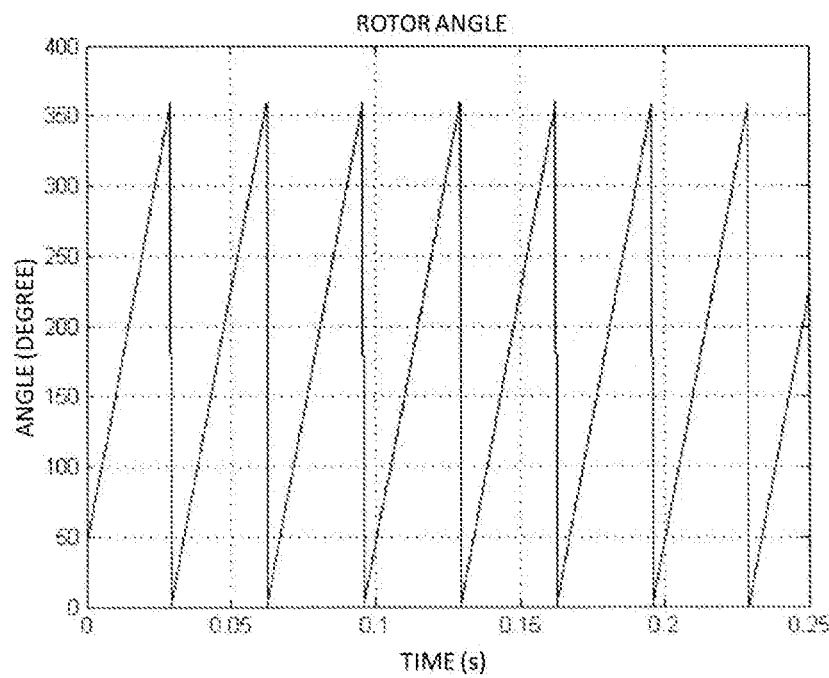
FIG. 8 is a graph illustrating a waveform of a rotor angle within a predetermined period.
Figure 9:
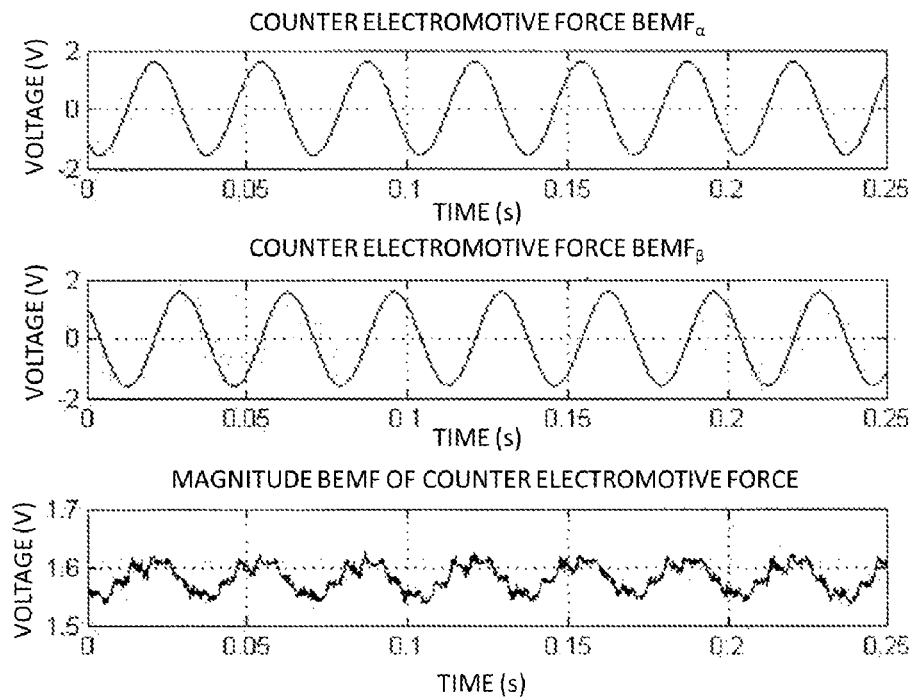
FIG. 9 is a graph illustrating a waveform (upper stage) of counter electromotive force $BEMF_\alpha$ within a predetermined period, a waveform (intermediate stage) of counter electromotive force $BEMF_\beta$ within the predetermined period, and a waveform (lower stage) of magnitude BEMF of the counter electromotive force within the predetermined period.
Figure 10:
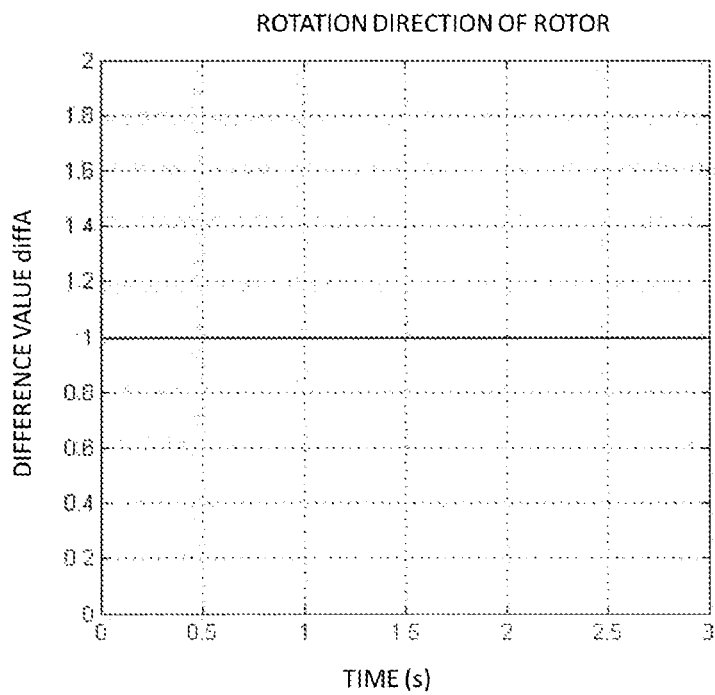
FIG. 10 is a graph illustrating a waveform of a difference value diffA detected between 0 second and 3.0 seconds.

FIG. 7 illustrates the waveform of the electric speed (rps) of the motor within a predetermined period (0 second to 0.25 seconds). FIG. 8 illustrates the waveform of the rotor angle within the predetermined period. FIG. 9 is a graph illustrating the waveform (upper stage) of the counter electromotive force BEMF$_\alpha$ within the predetermined period, the waveform (intermediate stage) of the counter electromotive force BEMF$_\beta$ within the predetermined period, and the waveform (lower stage) of magnitude BEMF of the counter electromotive force within the predetermined period. FIG. 10 illustrates the waveform of the difference value diffA detected between 0 second and 3.0 seconds. Horizontal axes in FIGS. 7 to 10 indicate time (second). A vertical axis in FIG. 7 indicates a frequency of the electric speed (Hz (=rps)). The vertical axis in FIG. 8 indicates the rotor angle (degree). The vertical axis in FIG. 9 indicates the voltage (V). The vertical axis in FIG. 10 indicates the difference value diffA of the comparator 134.

FIGS. 7 to 10 illustrate various waveforms acquired when the rotor rotates at a high speed (30 rps) in the normal rotation direction. For example, in the case that the EPS system is considered, the high-speed range with respect to the rotation in the normal rotation direction can be greater than or equal to 26.2 rps.

The result in FIG. 10 indicates that the comparator 134 acquires the difference value diffA=1 to detect the rotation of the rotor in the normal rotation direction. It can be seen that the rotation direction of the rotor is correctly detected when the rotor rotates at high speed in the normal rotation direction.

Figure 11:
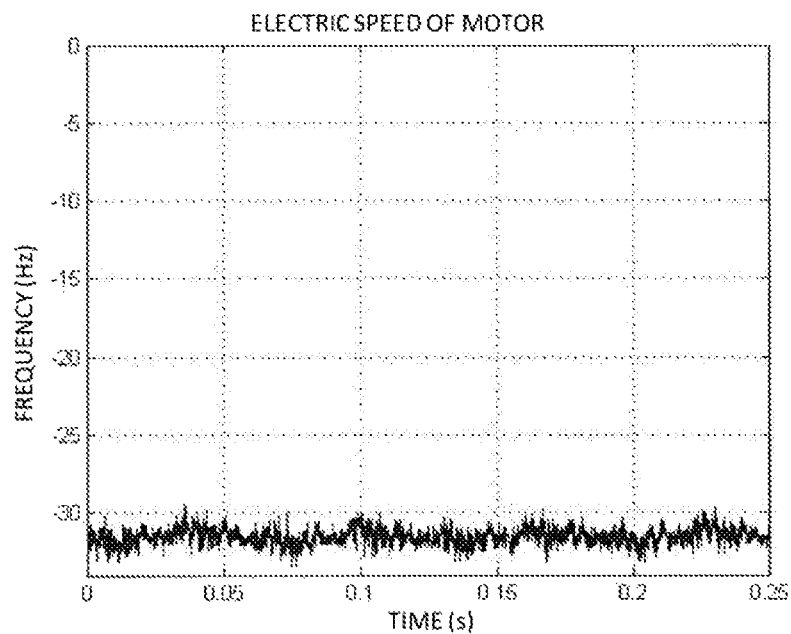
FIG. 11 is a graph illustrating a waveform of the electric speed of the motor within the predetermined period.
Figure 12:
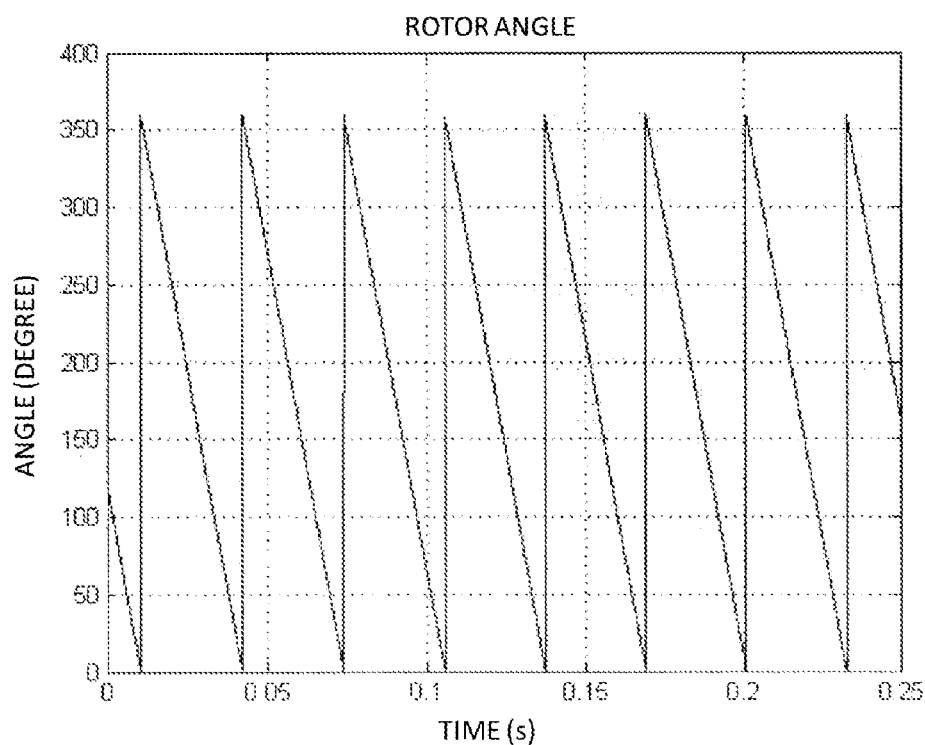
FIG. 12 is a graph illustrating the waveform of the rotor angle within the predetermined period.
Figure 13:
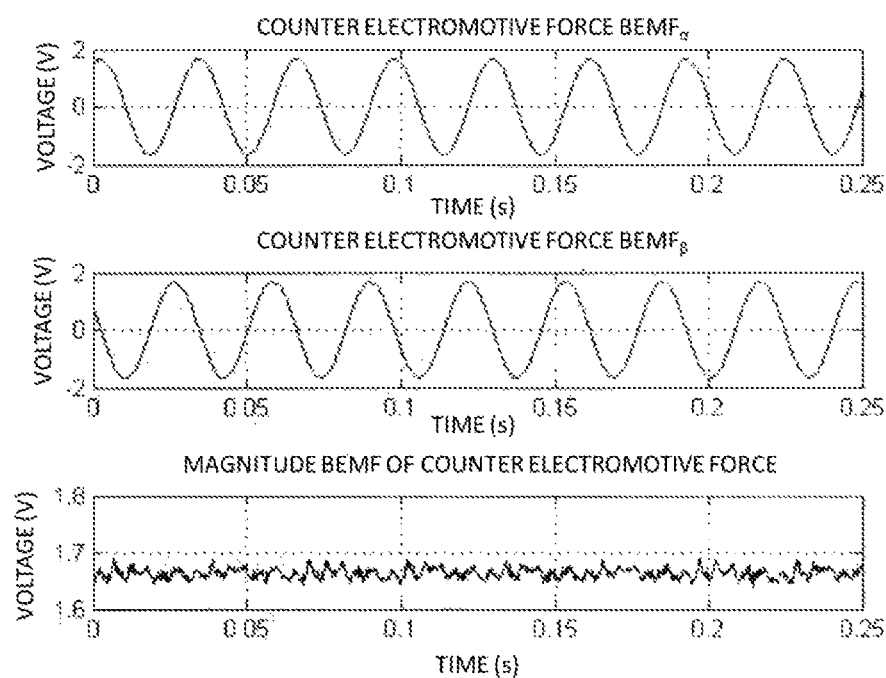
FIG. 13 is a graph illustrating the waveform (upper stage) of the counter electromotive force $BEMF_\alpha$ within the predetermined period, the waveform (intermediate stage) of the counter electromotive force $BEMF_\beta$ within the predetermined period, and the waveform (lower stage) of the magnitude BEMF of the counter electromotive force within the predetermined period.
Figure 14:
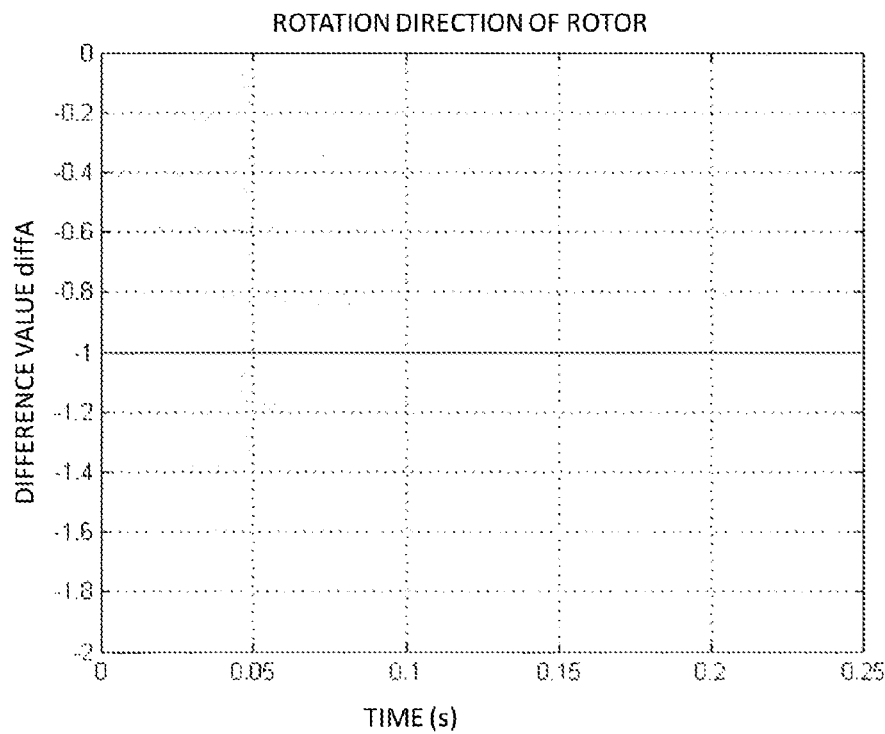
FIG. 14 is a graph illustrating the waveform of the difference value diffA detected between 0 second and 0.25 seconds.

FIG. 11 illustrates the waveform of the electric speed of the motor within the predetermined period (0 seconds to 0.25 seconds). FIG. 12 illustrates the waveform of the rotor angle within the predetermined period. FIG. 13 is a graph illustrating the waveform (upper stage) of the counter electromotive force BEMF$_\alpha$ within the predetermined period, the waveform (intermediate stage) of the counter electromotive force BEMF$_\beta$ within the predetermined period, and the waveform (lower stage) of magnitude BEMF of the counter electromotive force within the predetermined period. FIG. 14 illustrates the waveform of the difference value diffA detected between 0 second and 0.25 seconds. The horizontal axes in FIGS. 11 to 14 indicate the time (second). The vertical axis in FIG. 11 indicates the frequency (Hz) of the electric speed. The vertical axis in FIG. 12 indicates the rotor angle (degree). The vertical axis in FIG. 13 indicates the voltage (V). The vertical axis in FIG. 14 indicates the difference value diffA of the comparator 134.

FIGS. 11 to 14 illustrate various waveforms acquired when the rotor rotates at a high speed (−30 rps) in the reverse rotation direction. For example, in the case that the EPS system is considered, the high-speed range with respect to the rotation in the reverse rotation direction can be less than or equal to 26.2 rps.

The result in FIG. 14 means that the comparator 134 acquires the difference value A=−1 to detect the rotation of the rotor in the reverse rotation direction. It can be seen that the rotation direction of the rotor is correctly detected when the rotor rotates at high speed in the reverse rotation direction.

Figure 15:
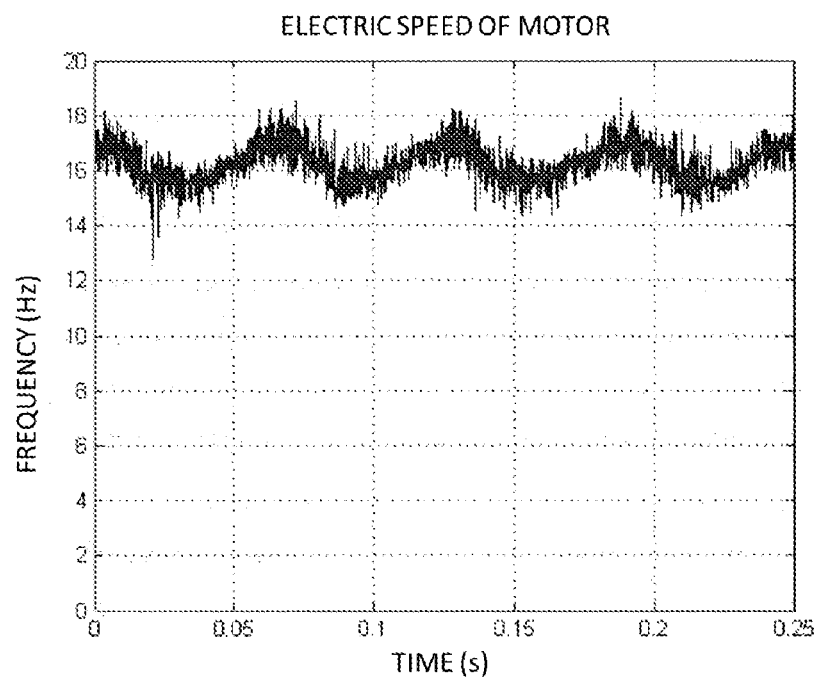
FIG. 15 is a graph illustrating the waveform of the electric speed of the motor within the predetermined period.
Figure 16:
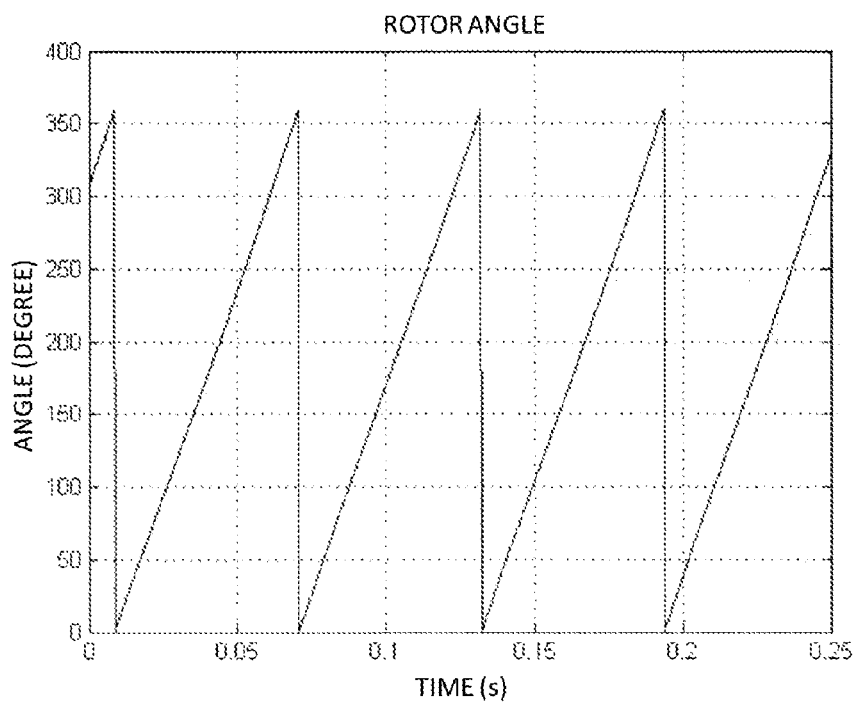
FIG. 16 is a graph illustrating the waveform of the rotor angle within the predetermined period.
Figure 17:
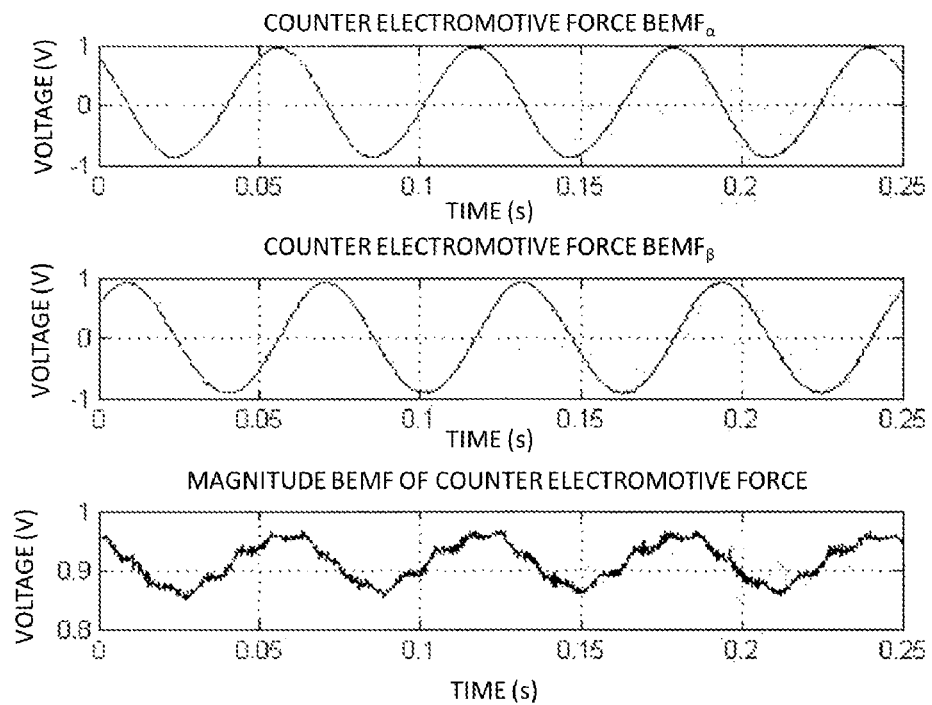
FIG. 17 is a graph illustrating the waveform (upper stage) of the counter electromotive force $BEMF_\alpha$ within the predetermined period, the waveform (intermediate stage) of the counter electromotive force $BEMF_\beta$ within the predetermined period, and the waveform (lower stage) of the magnitude BEMF of the counter electromotive force within the predetermined period.
Figure 18:
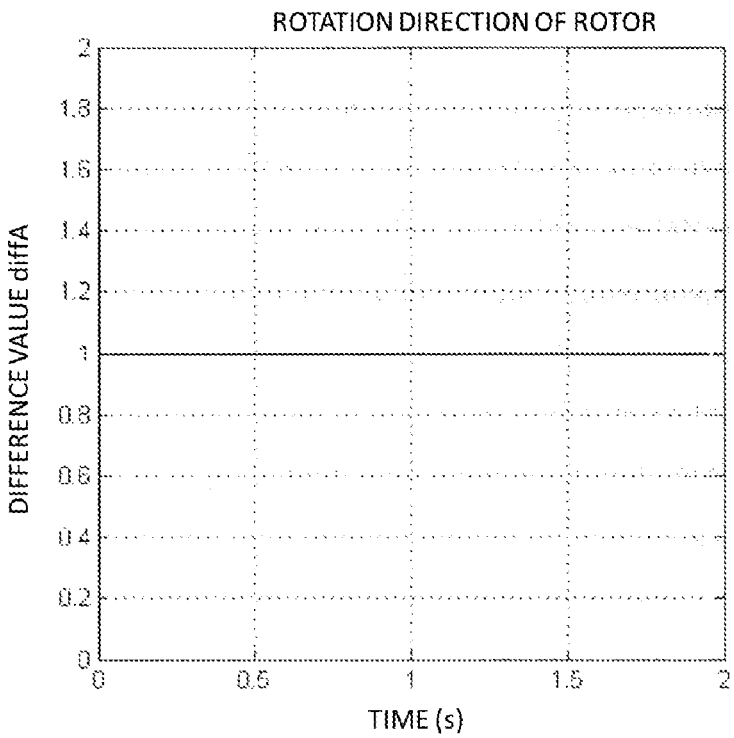
FIG. 18 is a graph illustrating the waveform of the difference value diffA detected between 0 second and 2.0 seconds.

FIG. 15 illustrates the waveform of the electric speed of the motor within the predetermined period (0 second to 0.25 seconds). FIG. 16 illustrates the waveform of the rotor angle within the predetermined period. FIG. 17 is a graph illustrating the waveform (upper stage) of the counter electromotive force BEMF$_\alpha$ within the predetermined period, the waveform (intermediate stage) of the counter electromotive force BEMF$_\beta$ within the predetermined period, and the waveform (lower stage) of magnitude BEMF of the counter electromotive force within the predetermined period. FIG. 18 illustrates the waveform of the difference value diffA detected between 0 second and 2.0 seconds. The horizontal axes in FIGS. 15 to 18 indicate the time (second). The vertical axis in FIG. 15 indicates the frequency (Hz) of the electric speed. The vertical axis in FIG. 16 indicates the rotor angle (degree). The vertical axis in FIG. 17 indicates the voltage (V). The vertical axis in FIG. 18 indicates the difference value diffA of the comparator 134.

FIGS. 15 to 18 illustrate various waveforms acquired when the rotor rotates at a low speed (16 rps) in the normal rotation direction. For example, in the case that the EPS system is considered, the low-speed range with respect to the rotation in the normal rotation direction can be greater than 0.0 rps and be less than 26.2 rps.

The result in FIG. 18 indicates that the comparator 134 acquires the difference value diffA=1 to detect the rotation of the rotor in the normal rotation direction. It can be seen that the rotation direction of the rotor is correctly detected when the rotor rotates at low speed in the normal rotation direction.

Figure 19:
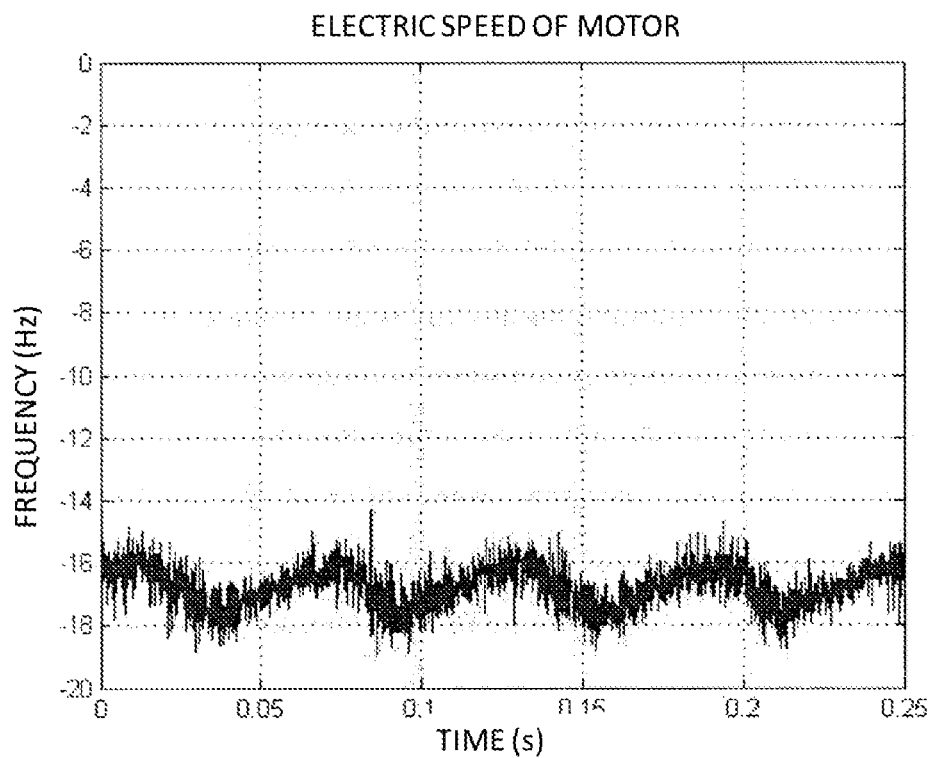
FIG. 19 is a graph illustrating the waveform of the electric speed of the motor within the predetermined period.
Figure 20:
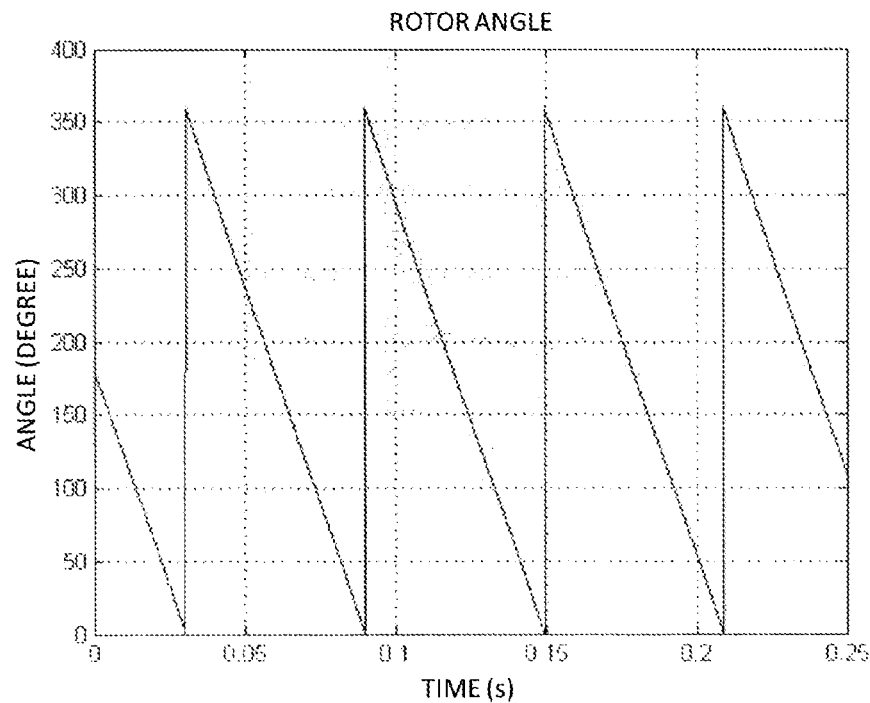
FIG. 20 is a graph illustrating the waveform of the rotor angle within the predetermined period.
Figure 21:
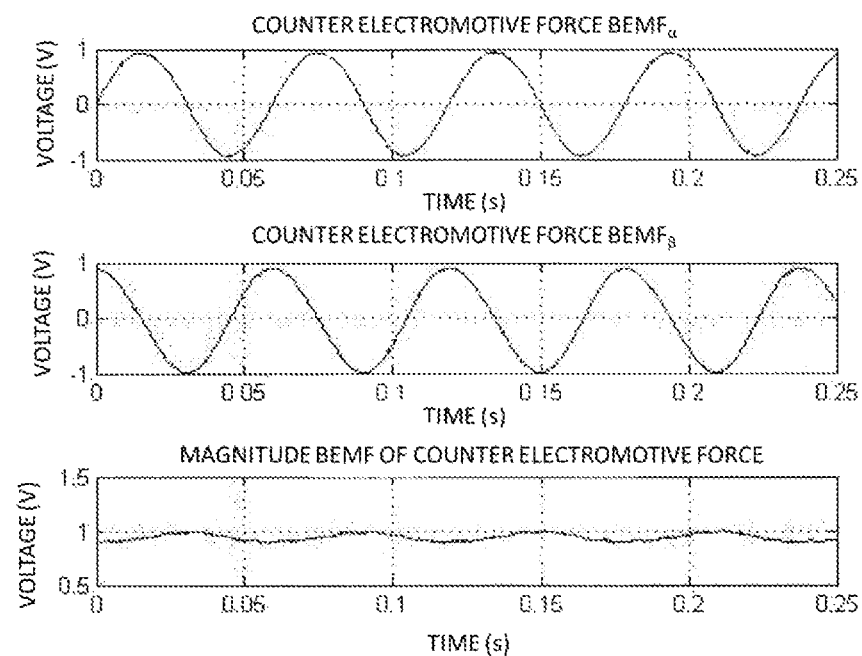
FIG. 21 is a graph illustrating the waveform (upper stage) of the counter electromotive force $BEMF_\alpha$ within the predetermined period, the waveform (intermediate stage) of the counter electromotive force $BEMF_\beta$ within the predetermined period, and the waveform (lower stage) of the magnitude BEMF of the counter electromotive force within the predetermined period.
Figure 22:
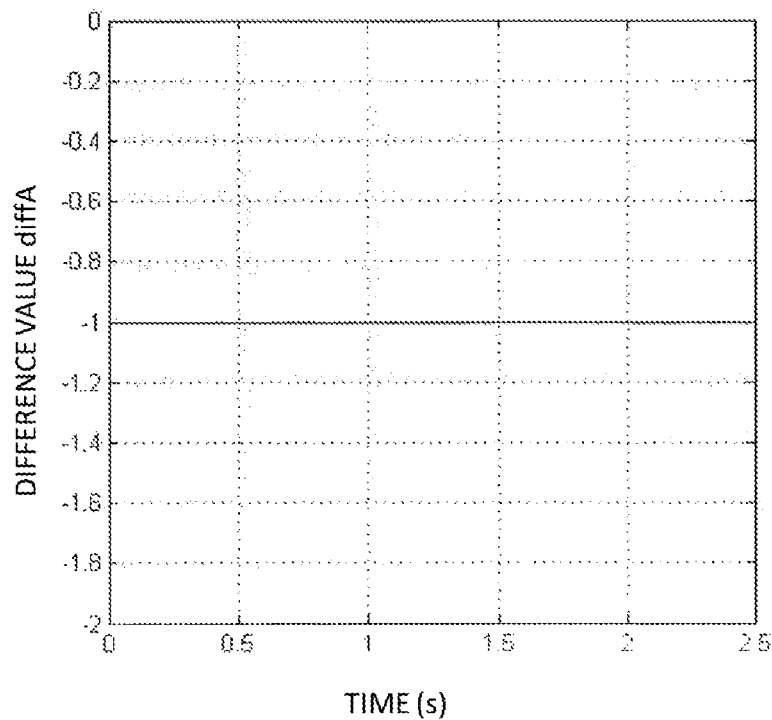
FIG. 22 is a graph illustrating the waveform of the difference value diffA detected between 0 second and 2.5 seconds.

FIG. 19 illustrates the waveform of the electric speed of the motor within the predetermined period (0 second to 0.25 seconds). FIG. 20 illustrates the waveform of the rotor angle within the predetermined period. FIG. 21 is a graph illustrating the waveform (upper stage) of the counter electromotive force $BEMF_\alpha$ within the predetermined period, the waveform (intermediate stage) of the counter electromotive force $BEMF_\beta$ within the predetermined period, and the waveform (lower stage) of magnitude BEMF of the counter electromotive force within the predetermined period. FIG. 22 illustrates the waveform of the difference value diffA detected between 0 seconds and 2.5 seconds. The horizontal axis in FIGS. 19 to 22 indicates time (second). The vertical axis in FIG. 19 indicates the frequency (Hz) of the electric speed. The vertical axis in FIG. 20 indicates the rotor angle (degree). The vertical axis in FIG. 21 indicates the voltage (V). The vertical axis in FIG. 22 indicates the difference value diffA of the comparator 134.

FIGS. 19 to 22 illustrate various waveforms acquired when the rotor rotates at a low speed (−16 rps) in the reverse rotation direction. For example, in the case that the EPS system is considered, the low-speed range with respect to the rotation in the reverse rotation direction can be greater than −26.2 rps and be less than 0.0 rps.

The result in FIG. 22 indicates that the comparator 134 acquires the difference value diffA=−1 to detect the rotation of the rotor in the reverse rotation direction. It can be seen that the rotation direction of the rotor is correctly detected when the rotor rotates at low speed in the reverse rotation direction.

From the above simulation results, in the technique of detecting the rotation direction of the rotor of the present disclosure, it can be seen that the rotation direction of the rotor can correctly be detected over the wide range from the low-speed drive including the starting to the high-speed drive.

Figure 23:
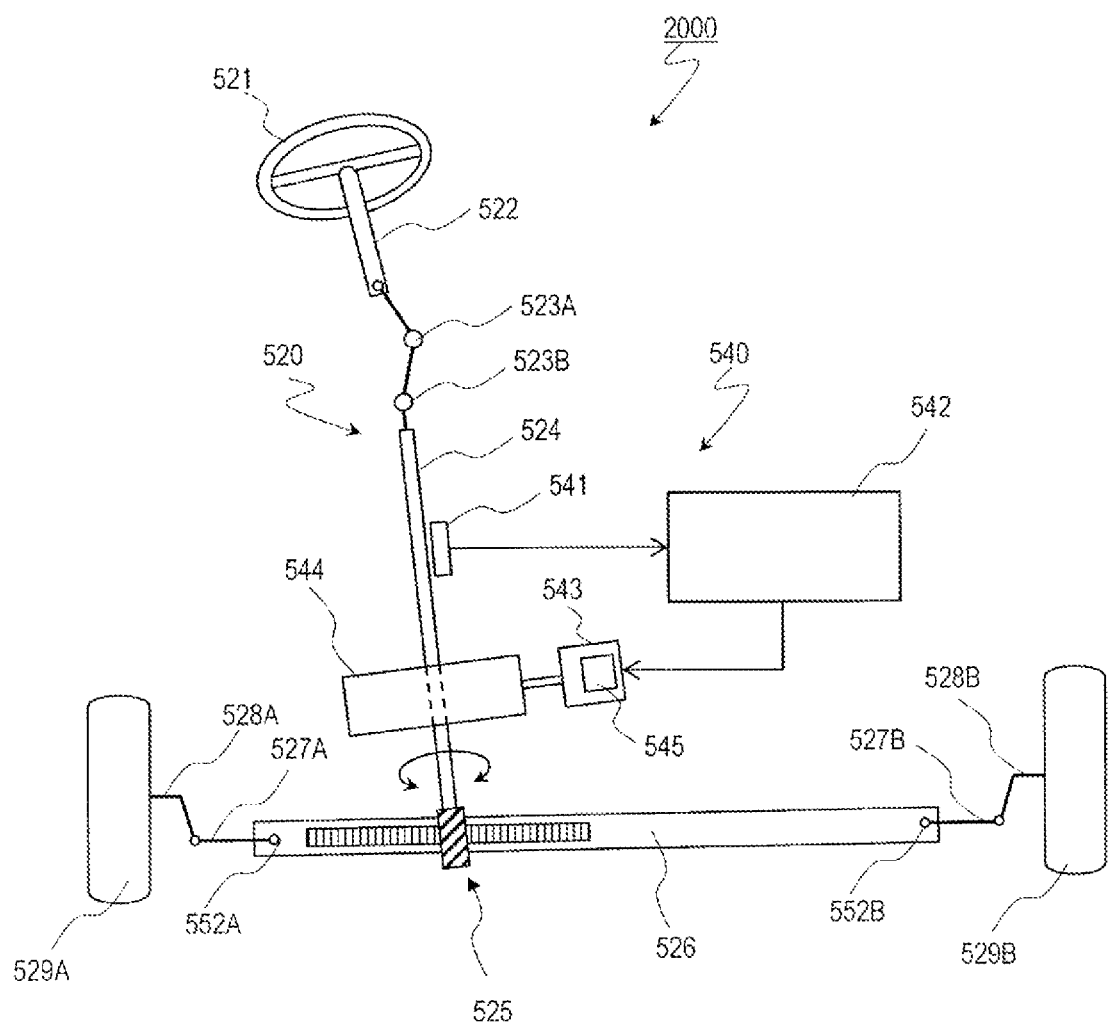
FIG. 23 is a schematic diagram illustrating a typical configuration of an EPS system 2000 according to a second exemplary embodiment of the present disclosure.

FIG. 23 schematically illustrates a typical configuration of an EPS system 2000 according to the present embodiment.

Typically, a vehicle such as an automobile is equipped with an EPS system. The EPS system 2000 according to the present embodiment includes a steering system 520, and an assist torque mechanism 540 that generates an assist torque. The EPS system 2000 generates an assist torque that assists a steering torque in a steering system, the steering torque being generated when a driver turns a steering wheel. The assist torque reduces a burden of a steering operation on the driver.

For example, the steering system 520 may include a steering wheel 521, a steering shaft 522, universal joints 523A, 523B, a rotating shaft 524, a rack and pinion mechanism 525, a rack shaft 526, left and right ball joints 552A, 552B, tie rods 527A, 527B, knuckles 528A, 528B, and left and right wheels 529A, 529B.

For example, the assist torque mechanism 540 includes a steering torque sensor 541, an automotive electronic control unit (ECU) 542, a motor 543, a speed reduction mechanism 544, and the like. The steering torque sensor 541 detects the steering torque in the steering system 520. The ECU 542 generates a drive signal based on a detection signal from the steering torque sensor 541. The motor 543 generates an assist torque responsive to the steering torque, based on the drive signal. The motor 543 transmits the assist torque to the steering system 520 via the speed reduction mechanism 544.

For example, the ECU 542 includes the controller 100, the drive circuit 200, and the like according to the first embodiment. In the automobile, the ECU serves as a core to constitute an electronic control system. In the EPS system 2000, for example, the ECU 542, the motor 543, and an inverter 545 constitute a motor control system. The motor control system 1000 according to the first embodiment may be suitably used as the motor control system.

The embodiments of the present disclosure is suitably applicable to a motor control system for an X-by-wire such as a shift-by-wire motor, a steering-by-wire motor, and a brake-by-wire, a traction motor, and the like, in which ability to detect the rotation of the rotor is required. Specifically, some X-by-wire systems including the position sensor perform sensor control based on an output signal from the position sensor. For example, in the steering-by-wire system, from the viewpoint of safety, it is necessary to monitor whether the actually detected rotation direction of the rotor is matched with a reference command indicating the rotation direction of the steering wheel. When the actually detected rotation direction of the rotor is matched with the reference command, the motor control system can continuously be operated. On the other hand, when the actually detected rotation direction of the rotor is not matched with the reference command (for example, the case that the detected rotation direction of the rotor indicates the normal rotation direction while the reference command indicates the reverse rotation direction), this means that some sort of malfunction is generated in the system. When the malfunction is generated, the automobile can safely stopped on the shoulder by, for example, switching the system to the backup mode.

For example, a motor control system according to an embodiment of the present disclosure is installable in a self-driving car compliant with Levels 0 to 4 (standards of automation) prescribed by the Japanese Government and the National Highway Traffic Safety Administration (NHTSA) of the United States Department of Transportation.

An embodiment of the present disclosure is widely applicable to a variety of apparatuses equipped with various motors, such as a vacuum cleaner, a dryer, a ceiling fan, a washing machine, a refrigerator, and an electric power steering system.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control method comprising:
acquiring a component $BEMF_\alpha$ on an α-axis and a component $BEMF_\beta$ on a β-axis of counter electromotive force of a motor in an αβ-fixed coordinate system;
performing time differentiation on the component $BEMF_\alpha$ on the α-axis and the component $BEMF_\beta$ on the β-axis;
obtaining a difference value between a first multiplication value and a second multiplication value, the first multiplication value being obtained by multiplying the component $BEMF_\alpha$ on the α-axis by a differential value of the component $BEMF_\beta$ on the β-axis, the second multiplication value being obtained by multiplying the component $BEMF_\beta$ on the β-axis by a differential value of the component $BEMF_\alpha$ on the α-axis;
detecting a rotation direction of the rotor based on the difference value; and
controlling the motor based on a detection result of the rotation direction of the rotor.

2. The motor control method according to claim 1, wherein in the detecting, rotation of the rotor in one of a normal rotation direction and a reverse rotation direction is detected when the difference value indicates a positive value, and rotation of the rotor in the other of the normal rotation direction and the reverse rotation direction is detected when the difference value indicates a negative value.

3. The motor control method according to claim 2, wherein in the controlling, a rotor angle $\theta$ is calculated based on a phase angle $\rho$, a load angle $\delta$, and the detection result of the rotation direction of the rotor, and the motor is controlled using the rotor angle $\theta$.

4. The motor control method according to claim 3, wherein when the rotation of the rotor in the normal rotation direction is detected in the detecting, the rotor angle $\theta$ is calculated based on an equation (1) in the controlling:

$$\theta = \rho + \delta \quad (1), \text{ and}$$

when the rotation of the rotor in the reverse rotation direction is detected in the detecting, the rotor angle $\theta$ is calculated based on an equation (2) in the controlling:

$$\theta = (\rho - 180°) + \delta \quad (2).$$

5. The motor control method according to claim 1, wherein in the acquiring, the component $BEMF_\alpha$ on the $\alpha$-axis is calculated based on an equation (3), and the component $BEMF_\beta$ on the $\beta$-axis is calculated based on an equation (4):

$$BEMF_\alpha = V_\alpha^* \cdot R \cdot I_\alpha \quad (3)$$

$$BEMF_\beta = V_\beta^* - R \cdot I_\beta \quad (4)$$

where $V_\alpha^*$ is a reference voltage on the $\alpha$-axis, $V_\beta^*$ is a reference voltage on the $\beta$-axis, $I_\alpha$ is a component on the $\alpha$-axis of an armature current, $I_\beta$ is a component on the $\beta$-axis of the armature current, and R is an armature resistance.

6. A motor control system comprising:
a motor; and
a control circuit to control the motor; wherein
the control circuit:
    acquires a component $BEMF_\alpha$ on an $\alpha$-axis and a component $BEMF_\beta$ on a $\beta$-axis of counter electromotive force in an $\alpha\beta$-fixed coordinate system;
    performs time differentiation on the component $BEMF_\alpha$ on the $\alpha$-axis and the component $BEMF_\beta$ on the $\beta$-axis;
    obtains a difference value between a first multiplication value and a second multiplication value, the first multiplication value being obtained by multiplying the component $BEMF_\alpha$ on the $\alpha$-axis by a differential value of the component $BEMF_\beta$ on the $\beta$-axis, the second multiplication value being obtained by multiplying the component $BEMF_\beta$ on the $\beta$-axis by a differential value of the component $BEMF_\alpha$ on the $\alpha$-axis;
    detects a rotational direction of the motor based on the difference value; and
    controls the motor based on a detection result of the rotation direction of the motor.

7. An electric power steering system comprising the motor control system according to claim 6.

* * * * *